March 1, 1927.
A. L. PARKER
TUBE COUPLING.
Filed Feb. 27, 1925
1,619,755
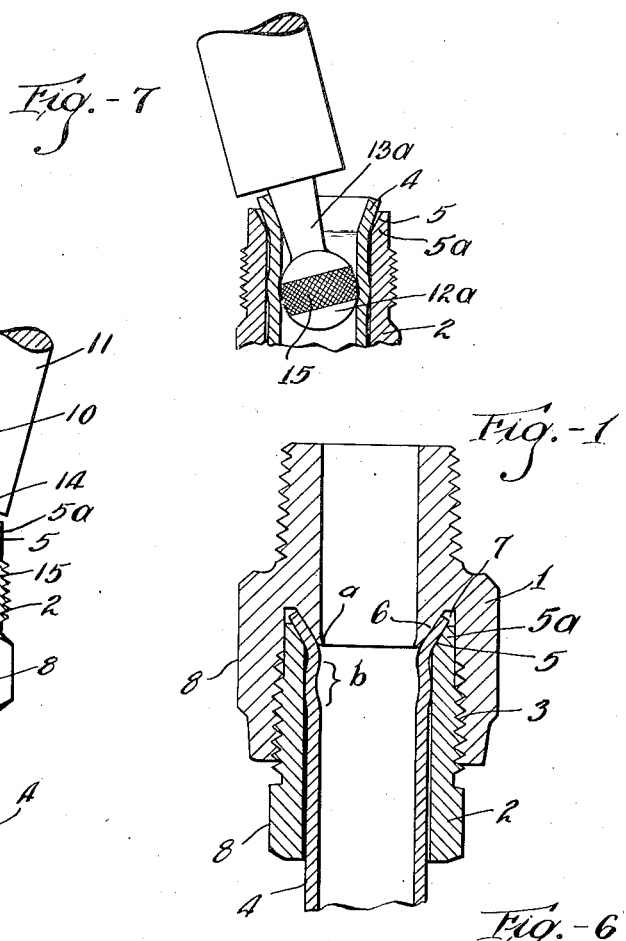
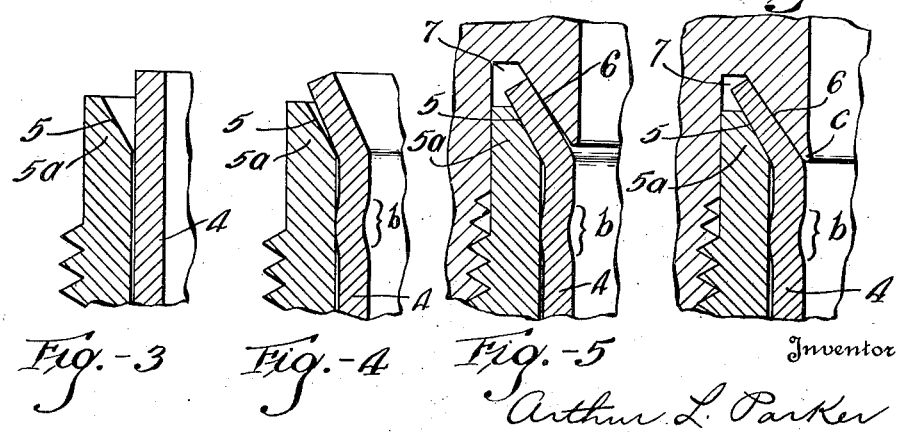
Inventor
Arthur L. Parker
By Brockett, Hyde & Milburn
Attorneys Patented Mar. 1, 1927.

1,619,755

UNITED STATES PATENT OFFICE.

ARTHUR L. PARKER, OF CLEVELAND, OHIO.

TUBE COUPLING.

Application filed February 27, 1925. Serial No. 12,020.

This invention relates to tube couplings and particularly to couplings for soft metal tubes and enabling fittings or other parts to be connected thereto.

The objects of the invention are to provide an improved coupling of simple form and capable of quantity production at low cost; to provide a very tight joint between the tube and coupling members which will withstand practically any pressure without leakage and which eliminates or greatly reduces the undesirable effects of vibrational strains transmitted from tube to coupling; to provide a coupling embodying a part serving as a die in the formation of the tube end by a flaring operation to complete the joint, and finally, to provide a coupling, the cooperating parts of which not only clamp the tube end between them but also react upon each other with a springing or yielding locking effect and prevent unloosening of the joint in the course of its service.

Further objects of the invention are in part obvious and in part will appear more in detail hereinafter.

In the drawings, Fig. 1 represents a longitudinal section through a coupling embodying the invention; Fig. 2 is an elevation, partly broken away and in section, and illustrating the tube forming operation; Figs. 3 to 6 are detail views, showing the flaring operation; and Fig. 7 is a view corresponding to Fig. 2, and illustrating a modification.

Referring first to Fig. 1 the coupling comprises two members, to wit, a female member or body portion 1 and a male member or nut 2 threaded together as at 3. In the assembled joint the nut 2 surrounds or is sleeved upon the soft metal tube 4 to which the fittings are to be attached and its bore is of a diameter very closely fitting the external surface of the tube wall with merely sufficient clearance to enable the parts to be readily sleeved together. The bore through the female member is of practically the same diameter (possibly slightly less, say one sixty-fourth of an inch or so) as the internal diameter of tube 4, so that in the joint there is practically no throttling or restricting of the channel or passage at the coupling.

The two members 1 and 2 are provided with cooperating means adapted to engage and clamp the end of the tube between them. The inter-engaging parts shown in the drawings include the tapered or beveled inner wall surface 5 of the nose end 5ª of member 2 and the tapered or inclined outer surface of a seat portion 6 of member 1, surrounding which seat portion is an annular recess 7 into which the tube end and the end of the nose of member 2 enter in the assembled joint. As clearly shown in the drawings, the nose of the member 2 for a material portion of its length is externally smooth or cylindrical, its diameter being that at the base of the threads on the male member. The length of this unthreaded nose may vary but, for example, may be the longitudinal extent of three to five or more threads. This externally smooth nose portion has a fairly close sliding fit within a similarly non-threaded portion of the female member 1 opposite to the seat member 6 therein, and preferably extending from the bottom of the channel 7 beyond the end of the seat portion, or, to put it another way, practically co-extensive in longitudinal extent with the unthreaded portion of the male member. As a consequence, the threaded portion of the female member does not extend into its cavity beyond the projecting end of said seat portion, and the female member is readily threaded by an ordinary tool entering its cavity, adapting the parts for convenient machine operations and to quantity production. Of course, both members 1 and 2 are suitably externally formed for turning them, such as by the usual hex or other surfaces 8 or any suitable wrench hold.

Before screwing the parts of the coupling together the end of the tube to which fittings are to be attached is properly formed to fit or approximately fit the male member sleeved around it. This forming operation can be effected in any desirable manner. Preferably, however, I provide a special forming tool for this operation, said tool and manner of its use being illustrated in Fig. 2. As there shown, the nut 2 is first sleeved around the tube 4 with the latter projecting a short distance, say one-sixteenth to three thirty-seconds of an inch, beyond the end of the nut. A proper tool, marked generally 10, is then introduced into the tube in the position shown in full lines and said tool is rolled around the axis of the tube and coupling (as shown by the dotted lines) with some pressure of the hand radially outward a sufficient number of times to properly flare and form the tube end. During this operation not only is the tube wall flared at its end, and consequently thinned an increasing amount toward the large end of the flare, but also the extreme edge of the flare is slightly beaded over the end of the nut, and inwardly of the flare and within the nut the cylindrical tube body 1 is expanded in order to more closely fit it to the nut, take up all tolerance and enable vibrational strains imparted to the tube to be transmitted to the coupling not through the flared flange but directly through the body of the tube wall. All of these effects are accomplished by the tool shown, which comprises a handle or shank portion 11 of any suitable form reduced at its end to provide a working portion including a bulbous and partly conical head 12 connected by a restricted neck 13 to a tapering or other suitably formed base portion 14, the angle or form of which is proportioned to the angle or form of the desirable flare of the tube end. When this tool is in place and is rotated in the manner described, the bulbous conical tool end engages the cylindrical portion of the tube wall and travels around the same, forming a fulcrum about which outwardly directed pressure on the tool handle is made effective upon the end of the tube to flare the same. The pressure imparted to the fulcrum, however, is localized along a zone gradually travelling around the cylinder tube wall and has the effect of slightly expanding the tube wall in the region marked $b$ to closely fit the nut. The conical portion 14 of the tool rolls around the extreme tube end and flares the same outwardly into close contact with the internal taper of the nut nose, and slightly beads the same over the end of the nose until the parts reach the form and condition shown in Fig. 1.

Having accomplished the forming operation as described the female member or body portion 1 is screwed into place as shown in Fig. 1. Remembering now that the flared portion of the tube is of slightly decreased thickness toward the larger end of the flare, the taper of the seat 6 and nut nose need not be made to conform exactly to the flare of the tube, as when the base and nut are screwed together, contact with the tube and application of wedging pressure thereto begins at either the large or smaller edge of the flare and usually at the smaller end of the flare or opposite the end of the seat 6 and approximately at the point marked "$a$" in the drawings. After contact is effected further threading of the parts together has several important effects. First, the outward wedging pressure of the seat 6 applied to the tube is transmitted therethrough to the nut nose, which is consequently expanded against the resilient or springing resistance of the metal to take up any tolerance between the unthreaded portions of the nose and female member. Likewise the same wedging pressure is exerted inwardly against the seat 6, compressing the same inwardly, as at C, Fig. 6. The result of the two effects is a stressing of the metal within its ultimate strength and the production of a yielding or resilient locking effect across the joint and tending to prevent loosening of the joint by unthreading of the parts during use. Also, of course, the parts move relatively longitudinally and the end of the swaged or flared tube end is moulded to fit more closely and to usually fill or nearly fill any cavity in the base of the recess 7.

In practice it is frequently found that the progressive action of flaring the end of the tube need not be wholly completed by the tool shown in Fig. 2. For example, said tool may progressively flare the end of the tube as described and as shown in Figs. 3 and 4 and the final forming step is accomplished in the assembly of the parts of the fitting, as shown in Figs. 5 and 6.

In this coupling, the angles of the seat and nut nose vary for different sizes of couplings and tube ends and according to the thickness of the tube wall, or for couplings of different metals, such as brass, Monel metal or duralumin. In extra heavy fittings, for example, the angle of the tapered nose of the male member may be from one half to about three degrees less than the angle of taper of the seat in the female member. For lighter walled tubes such variation is unnecessary. Also as the sizes of couplings increase the angle of flare of both surfaces may increase, the total range of such variation in flare amounting to about ten degrees. Where the coupling is designed for a heavy walled tube the nose of the inclined seat portion in the female member may be made more blunt or rounded off than in standard fittings. From the above it will be apparent that I have provided a tube coupling wherein the tapered seats which engage the inner and outer faces of the flared end of the tube made be formed without any special accurate shaping of one relative to the other. That is, these tapered faces may be at a slight angle to each other or may be approximately parallel. The parts of the male and female coupling on which these tapered seats are formed are so dimensioned and positioned relative to each other and the tube end that when the coupling members are threaded together, and the tapered seats are brought into contact with the flared end of the tube, said parts of the coupling will yield so that said seats will be brought into intimate contact with the inner and outer faces of the flared end of the tube substantially throughout the entire length of the seats.

It will also be noted from the above that

I have provided a coupling wherein there is a smooth cylindrical surface at the nose end of the male member which cooperates with a smooth cylindrical surface on the female member, and the cooperating tapered surfaces on the male and female members are entirely within the zone of said cylindrical surfaces. By this arrangement of parts, the outward pressure against the nose end of the male member when the parts are threaded together to clamp the flared end of the tube, will force said cylindrical portion on the nose into close contact with the cylindrical portion on the female member. This aids in preventing the members from unthreading, even to a slight extent, which might cause a leak. Then again, this expansion of the nose end to bring about the contact of the cylindrical surfaces changes, to a slight extent, the angularity of the tapered seat on the nose and brings about an adjustment to conform to the angularity of the flared end of the tube. Furthermore, the contacting of the cylindrical surfaces brings about a radial pressure through the flared end of the tube, against the portion of the female member carrying the tapered seat which contracts to a certain extent this part of the female portion and changes the angularity slightly of the tapered seat to conform to the angularity of the inner wall of the flared end of the tube.

Fig. 7 illustrates a modified form of flaring tool, used particularly for heavier walled tubing, the form of tool used in Fig. 2 being usually better adapted for lighter walled tubes. The tool shown in Fig. 7 is provided with a substantially spherical head 12ª having a diameter approximating the internal diameter of the tube, said head being connected to the shank by a reduced neck 13ª of tapering or other form proportioned and on a proper angle, such as to shape the flare of the tube end as the tool is rolled around the same. By so modifying the form of the tool the pressure exerted against the side of the tube wall may be more or less proportioned to the tube wall thickness. Both of the tools shown in Figs. 2 and 7 may also have those surfaces of the bulbous end which contact with the tube wall roughened in any suitable manner, such as by knurling, as indicated at 15 to avoid slipping and assist in concentration of the pressure effect at the proper points.

In flaring a tube with the tools shown it will be observed that the flaring tool has a tendency to roll the tube flare, so that the tube is not thin at the outer edge of the flare as much as would be the case if the flare is formed by a simple punch press expanding operation.

What I claim is:

1. A tube coupling comprising cooperating male and female members threaded together, said female member having a tapered seat adapted to extend into a flared tube end, said male member having a tapered seat adapted to surround said flared tube end, said threads on the male and female members being so disposed that the seats are brought into contact with the flared tube end before the threaded portions have reached the limit of their threading movement, the portions of the male member and the portions of the female member carrying the tapered seats being dimensioned and positioned relative to each other and the tube end so that when the male member is threaded into said female member, said portions will yield and the tapered seats be brought into intimate contact with the inner and outer faces of the flared end of the tube throughout substantially the entire length of the seats.

2. A tube coupling comprising cooperating male and female members threaded together, said female member having a tapered seat adapted to extend into a flared tube end, said male member having a tapered seat adapted to surround said flared tube end, said threads on the male and female members being so disposed that the seats are brought into contact with the flared tube end before the threaded portions have reached the limit of their threading movement, the portions of the male member and the portions of the female member carrying the tapered seats being dimensioned and positioned relative to each other and the tube end so that when the male member is threaded into said female member, said portions will yield, and the tapered seats be brought into intimate contact with the inner and outer faces of the flared end of the tube throughout substantially the entire length of the seats, said female member having a smooth cylindrical surface radially opposed to the tapered seat thereon, and said male member having at the nose end thereof, a smooth cylindrical surface adapted to cooperate with said cylindrical surface on said female member, said cylindrical surfaces extending to a sufficient extent so as to effect the yielding of the parts and the contact of the tapered seats with the tube end without injuring the threads joining the male and female members.

3. A tube coupling comprising cooperating male and female members threaded together, said female member having a tapered seat adapted to extend into a flared tube end, said male member having a tapered seat adapted to surround said flared tube end, said threads on the male and female members being so disposed that the seats are brought into contact with the flared tube end before the threaded portions have reached the limit of their threading movement, the portions of the male member and the portions of the female member carrying the tapered seats being dimensioned and positioned relative to each other and the tube end so that when the male member is threaded into said female member, said portions will yield, and the tapered seats be brought into intimate contact with the inner and outer faces of the flared end of the tube throughout substantially the entire length of the seats, said female member having a smooth cylindrical surface radially opposed to the tapered seat thereon throughout approximately the entire length of said tapered seat, and said male member having at the nose end thereof, a smooth cylindrical surface adapted to cooperate with said cylindrical surface on said female member.

4. A tube coupling comprising cooperating male and female members, the male member being adapted to surround a tube having a flared end and having a threaded portion and an external cylindrical smooth surface and the female member having an internal recess with a portion of the wall thereof threaded, and having at the inner portion of the wall a smooth cylindrical surface adapted to cooperate with the cylindrical surface of the male member, said female member also having a bore approximately the size of the tube bore and said members being provided entirely within the zone of said cylindrical surface with cooperating tapered surfaces to receive between them the flared tube end.

5. A tube coupling comprising cooperating male and female members threaded together, the female member having a cavity provided beyond its threads and having a smooth cylindrical portion approximately throughout the zone of and opposite a tapered seat on said female member, said male member having an extended cylindrical nose portion beyond its threads of proper size to approximately fit the corresponding cylindrical portion of the female member, said nose portion being dimensioned so that it is expanded into close contact with the cylindrical portion of said female member by the wedging pressure transmitted from the seat portion of the female member through the flared tube end to the nose portion of the male member.

In testimony whereof I hereby affix my signature.

ARTHUR L. PARKER.